United States Patent

Drobnik

Patent Number: 6,055,165
Date of Patent: Apr. 25, 2000

[54] METHOD AND APPARATUS FOR LIMITING CURRENT TO HIGH FREQUENCY ALTERNATING CURRENT TO VOLTAGE REGULATOR MODULES

[75] Inventor: Josef C. Drobnik, Hillsboro, Oreg.

[73] Assignee: Intel Corporation, Santa Clara, Calif.

[21] Appl. No.: 09/312,026

[22] Filed: May 14, 1999

[51] Int. Cl.[7] .................................................. H02M 1/12
[52] U.S. Cl. .............................................. 363/44; 363/52
[58] Field of Search ................................ 363/144, 65, 44, 363/52, 47

[56] References Cited

U.S. PATENT DOCUMENTS

5,901,057   5/1999   Brand et al. ........................... 363/144

*Primary Examiner*—Shawn Riley
*Attorney, Agent, or Firm*—Blakely, Sokoloff, Taylor & Zafman LLP

[57] ABSTRACT

A high frequency alternating current (AC) voltage regulator module (VRM) includes a protection circuit that regulates a level of current from power in a high frequency AC domain received from an AC bus. A post-regulator unit is coupled to the protection circuit. The post-regulator unit regulates the power to a component on a computer system.

11 Claims, 8 Drawing Sheets

METHOD AND APPARATUS FOR LIMITING CURRENT TO HIGH FREQUENCY ALTERNATING CURRENT TO VOLTAGE REGULATOR MODULES

FIELD OF THE INVENTION

The present invention relates to the field of power distribution in computer systems. More specifically, the present invention relates to a high frequency alternating current (AC) power distribution system.

BACKGROUND OF THE INVENTION

Power distribution systems serve the purpose of supplying power to components in a computer systems. Most personal computers can be plugged into a standard electrical outlet. The power distribution system supply pulls the required amount of power and converts the power from an alternating current (AC) domain to a direct current (DC) domain. It also regulates the voltage and current to eliminate spikes and surges common in most electrical systems. Not all power supplies, however, perform an adequate job in regulation, thus a computer is often susceptible to large current fluctuations.

With today's highly sensitive electronic equipment, internal current surges play a significant role in the deterioration of that equipment. Proper power protection is important for protecting components from the immediate and long-term effects of current surge damage. The drawback of protection circuits used in the past were that they required a current sensor and a control circuit to monitor and regulate the amount of current in the system. The current sensor and control circuit required additional physical space and cost that were undesirable.

SUMMARY

A high frequency alternating current (AC) voltage regulator module is disclosed. The high frequency AC voltage regulator module includes a protection circuit that regulates a level of current from power in a high frequency AC domain received from an AC bus. A post-regulator unit is coupled to the protection circuit. The post-regulator unit regulates the power to a component on a computer system.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
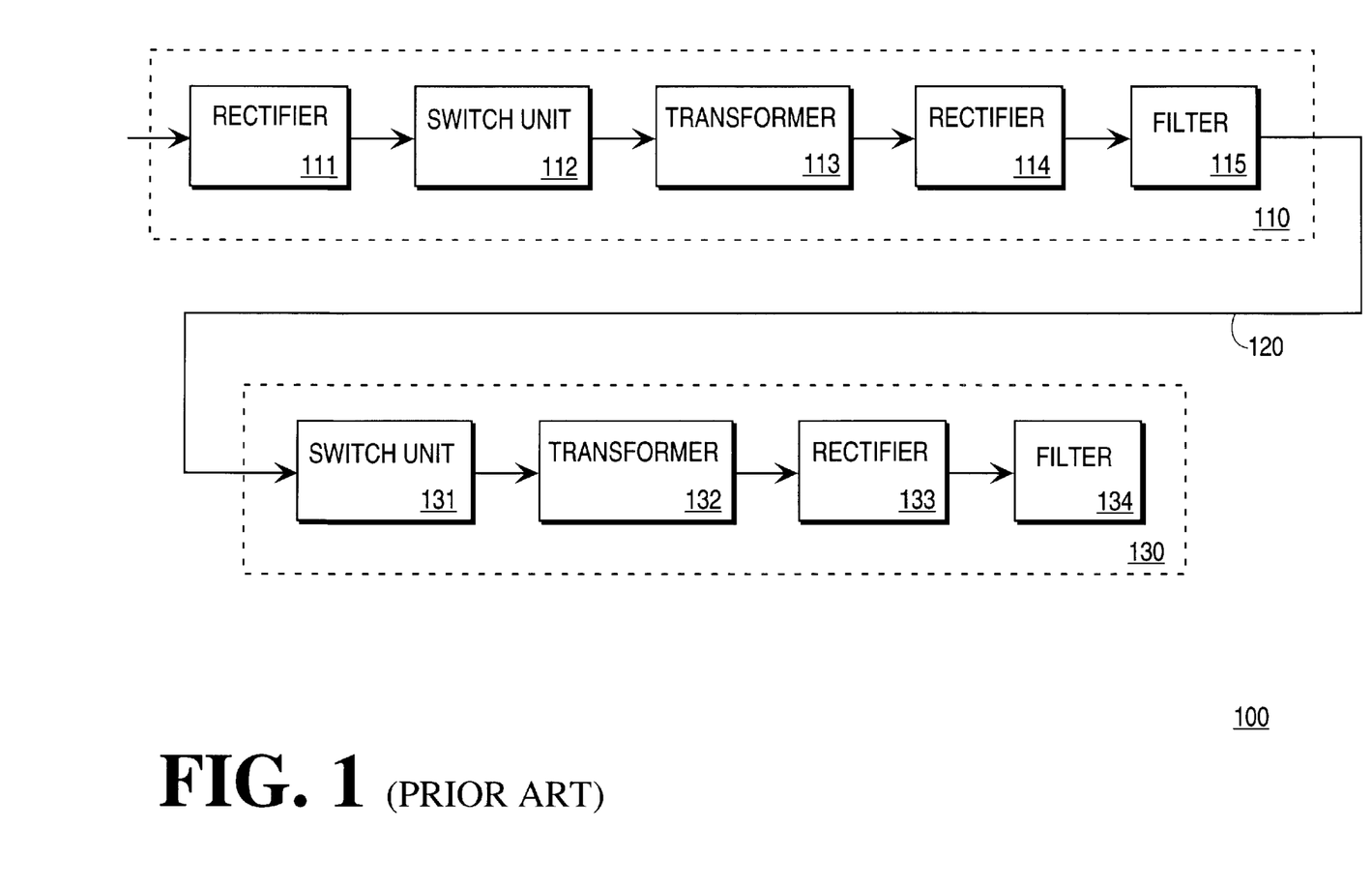
FIG. 1 is a block diagram of a conventional direct current power distribution system.

FIG. 1 illustrates a conventional direct current (DC) power distribution system 100 known in the prior art. The DC power distribution system 100 includes a main power supply 110. The main power supply 110 receives power from a power source and processes the power before transmitting it to a voltage regulator module 130 via a connector 120. The main power supply 110 includes a first rectifier unit 111 that receives power in an alternating current (AC) domain from a power source. The first rectifier unit 111 converts the AC power to DC power. A first switch unit 112 is coupled to the first rectifier unit 111. The first switch unit 112 receives the DC power from the first rectifier unit 111 and converts the DC power to high frequency AC power. A first transformer 113 is coupled to the first switch unit 112. The first transformer 113 receives the high frequency AC power from the first switch unit 112 and steps the high frequency AC power down to a lower level. A second rectifier unit 114 is coupled to the first transformer 113. The second rectifier unit 114 receives the high frequency AC power from the first transformer and converts the high frequency AC power to DC power. A first filter unit 115 is coupled to the second rectifier unit 114. The first filter unit 115 receives the DC power from the second rectifier unit 114 and filters away noise from the DC power and transmits the DC power to the connector 120.

The DC distribution system 100 also includes a voltage regulator module 130 coupled to the main power supply 110. The voltage regulator module 130 receives the DC power from the connector 120 and further regulates the power before transmitting the power to a component on a computer system (not shown). The voltage regulator module 130 includes a second switch unit 131. The second switch unit 131 receives the DC power from the main power supply 110 and converts the DC power to AC power. A second transformer 132 is coupled to the second switch 131. The second transformer receives the AC power from the second switch and steps the AC power down to a lower level. A third rectifier unit 133 is coupled to the second transformer. The third rectifier receives the AC power and converts it to DC power. A second filter unit 134 is coupled to the third rectifier unit 133. The second filter unit 134 receives the DC power from the third rectifier unit 133 and filters away noise from the DC power. The DC power is transmitted from the power regulator module 130 to a component requiring power.

When multiple voltage regulator modules are coupled to the main power supply 110, the transformer 113 is required to have multiple windings. Additional rectifiers and filters in the main power supply 110 would connect the power from the additional windings of the transformer to additional connectors that transmits the power to the additional voltage regulator modules.

Figure 2:
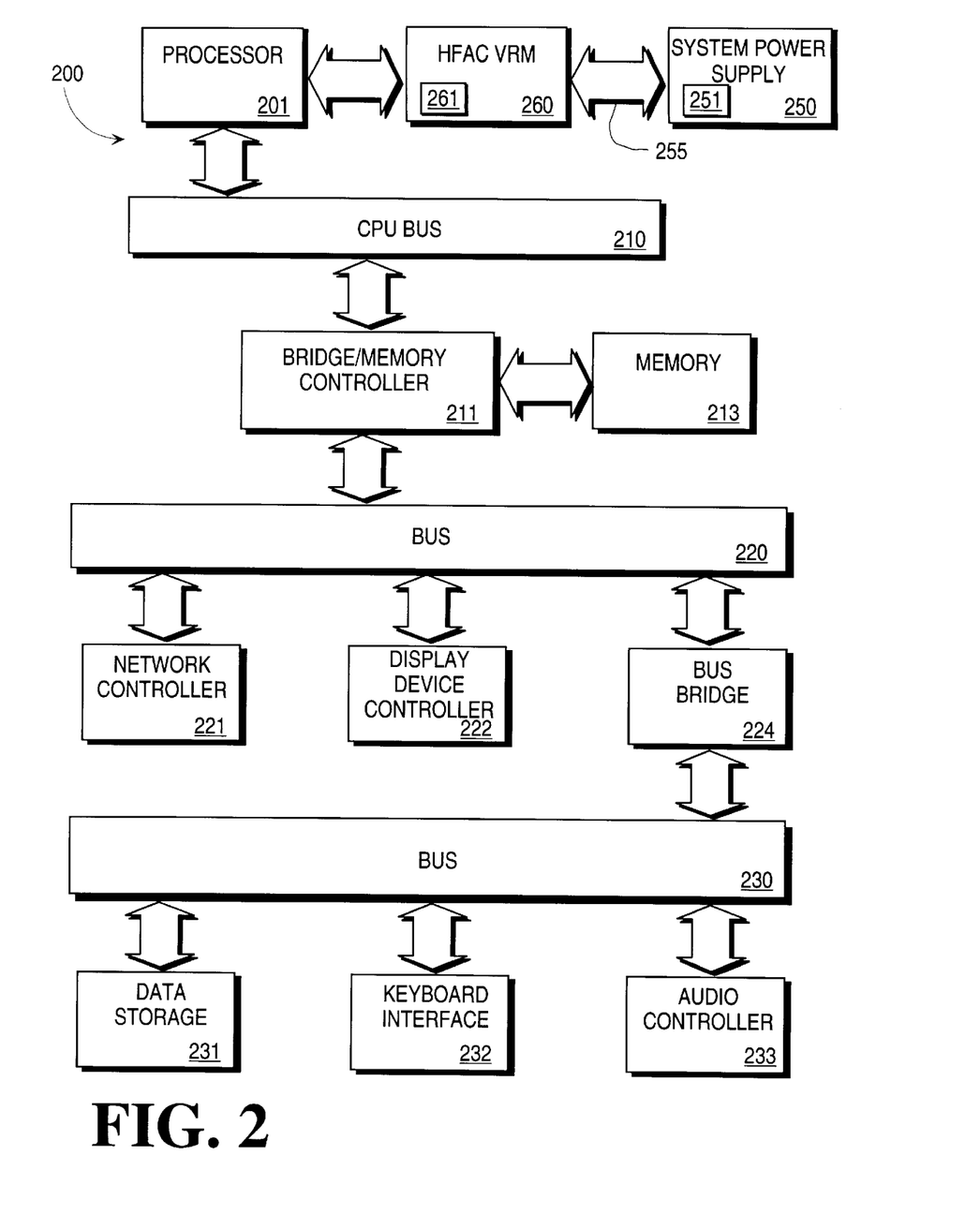
FIG. 2 is a block diagram of a computer system implementing an embodiment of the present invention.

FIG. 2 illustrates a computer system 200 upon which an embodiment of the present invention can be implemented. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a synchronous direct random access memory (SDRAM) device, or other memory device. The memory 213 may store instructions and code represented by data signals that may be executed by the processor 201.

A bridge/memory controller 211 is coupled to the CPU bus 210 and the memory 213. The bridge/memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device (not shown) to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard (not shown) to the computer system 200 and transmits data signals from a keyboard to the computer system 200. An audio controller 233 is coupled to the second I/O bus 230. The audio controller 233 operates to coordinate the recording and playing of sounds.

A bus bridge 224 couples the first I/O bus 220 to the second I/O bus 230. The bus bridge 224 operates to buffer and bridge data signals between the first I/O bus 220 and the second I/O bus 230.

The computer system 200 includes a system power supply 250. The system power supply 250 receives power from a power source such as a wall socket (not shown) or other power source. The system power supply 250 includes an inverter unit 251 that processes the power received from the power source and transmits the power in a high frequency alternating current (AC) domain on an AC bus 255. The computer system 200 includes a high frequency AC voltage regulator module 260. The high frequency AC voltage regulator module 260 is coupled to the AC bus 255. The high frequency AC voltage regulator module 260 receives power in the AC domain from the AC bus 255 and includes a post-regulator unit 261 that regulates the power to a voltage and current level appropriate for the processor 201.

FIG. 2 illustrates the computer system having a single high frequency AC voltage regulator module 260 coupled to the AC bus 255. It should be appreciated that any number of high frequency AC voltage regulator modules may be coupled to the AC bus 255 to provide regulated power to the components in the computer system. According to an embodiment of the present invention, the memory 213, memory/bridge controller 211, network controller 221, display device controller 222, data storage device 231, keyboard interface 232, audio controller 233, and bus bridge 224 may each be coupled to a high frequency AC voltage regulator module (not shown) that receives power from the AC bus 255.

Figure 3:
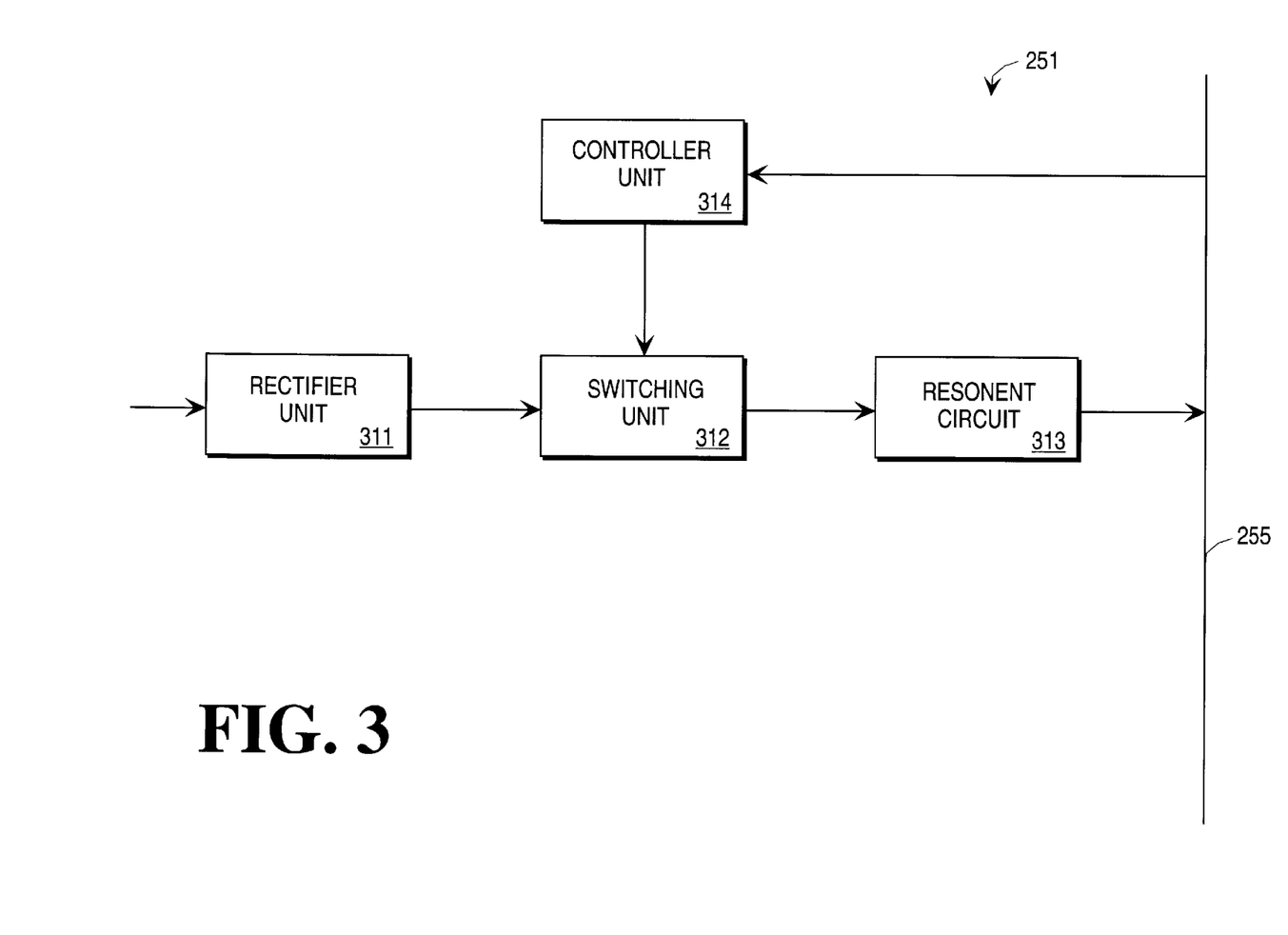
FIG. 3 is a block diagram of an inverter unit in a system supply according to an embodiment of the present invention.

FIG. 3 is a block diagram of an inverter 251 in a system power supply according 250 (shown in FIG. 2) to an embodiment of the present invention. The inverter unit 251 includes a rectifier unit 311. The rectifier unit 311 receives AC power from a power source (not shown). The rectifier unit 311 converts the AC power to a DC domain. A switching unit 512 is coupled to the rectifier unit 311. The switching unit 112 receives the DC power from the rectifier unit 311 and converts the DC power to a high frequency AC domain. A resonant circuit 313 is coupled to the switch unit 112. The resonant circuit receives high frequency AC power from the switching unit and smooths the high frequency AC power before transmitting it onto the AC bus 255. According to an embodiment of the present invention, the resonant circuit 313 includes a capacitor and an inductor. A controller unit 314 is coupled to the AC bus 255 and the switching unit 312.

The controller unit 314 monitors the voltage and current levels on the AC bus and adjusts the switching unit 312 such that the power transmitted onto the AC bus 255 via the resonant circuit 313 is at predetermined level.

The rectifier unit 311, switching unit 312, resonant circuit 313, and the controller unit 314 may be implemented using any known circuitry or technique. According to an embodiment of the present invention, the rectifier unit 311, switching unit 312, resonant circuit 313, and the controller unit 314 all reside on a single semiconductor substrate.

Figure 4:
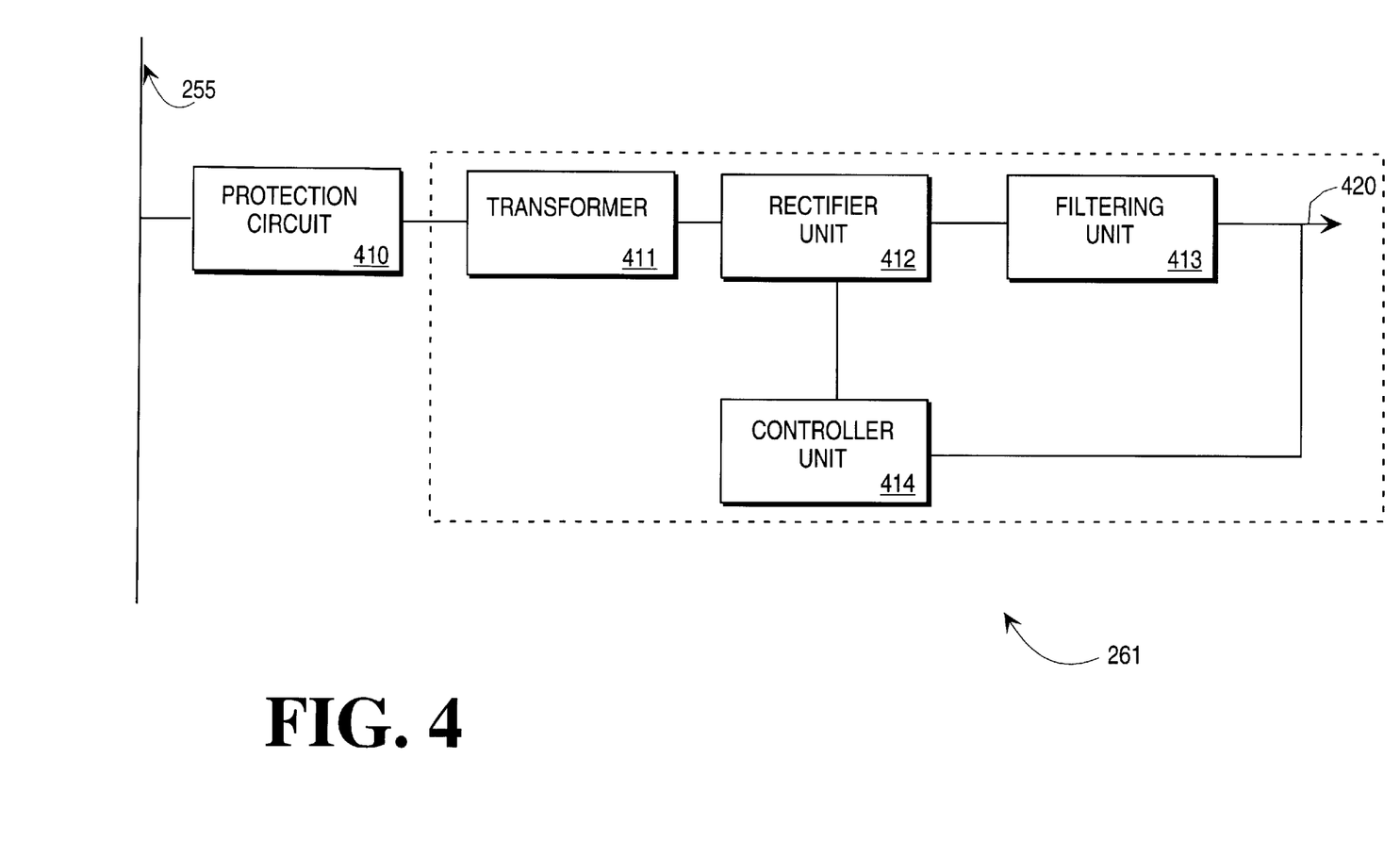
FIG. 4 is a block diagram of a post-regulator unit in a high frequency alternating current voltage regulator modulate according to an embodiment of the present invention.

FIG. 4 is a block diagram of a high frequency AC voltage regulator module 260 (shown in FIG. 2) according to an embodiment of the present invention. The AC voltage regulator module 260 includes a protection circuit 410 and a post-regulator unit 261. The protection circuit 410 is coupled to the AC bus 255 and receives power in the high frequency AC domain from the AC bus 255. The protection circuit 410 regulates a level of current received from the AC bus 255 that is sent to the post-regulator unit 261. By regulating the level of current that is sent to the post-regulator unit 261, the protection circuit 410 prevents levels of current that might cause damage to the post-regulator unit 261 from being transmitted.

According to an embodiment of the present invention, the protection circuit 410 includes an inductor component and a capacitor component. The inductor component and the capacitor component of the protection circuit 410 and a resistive load generated by the post-regulator unit 261 forms an in-series resonant circuit. According to an embodiment of the present invention, the in-series resonant circuit may be configured to resonate at the switching frequency of the inverter unit 251 (shown in FIG. 2) by matching the value of the inductor and the capacitor components of the protection circuit 410 with the resistive load generated by the post-regulator unit 261.

Figure 5:
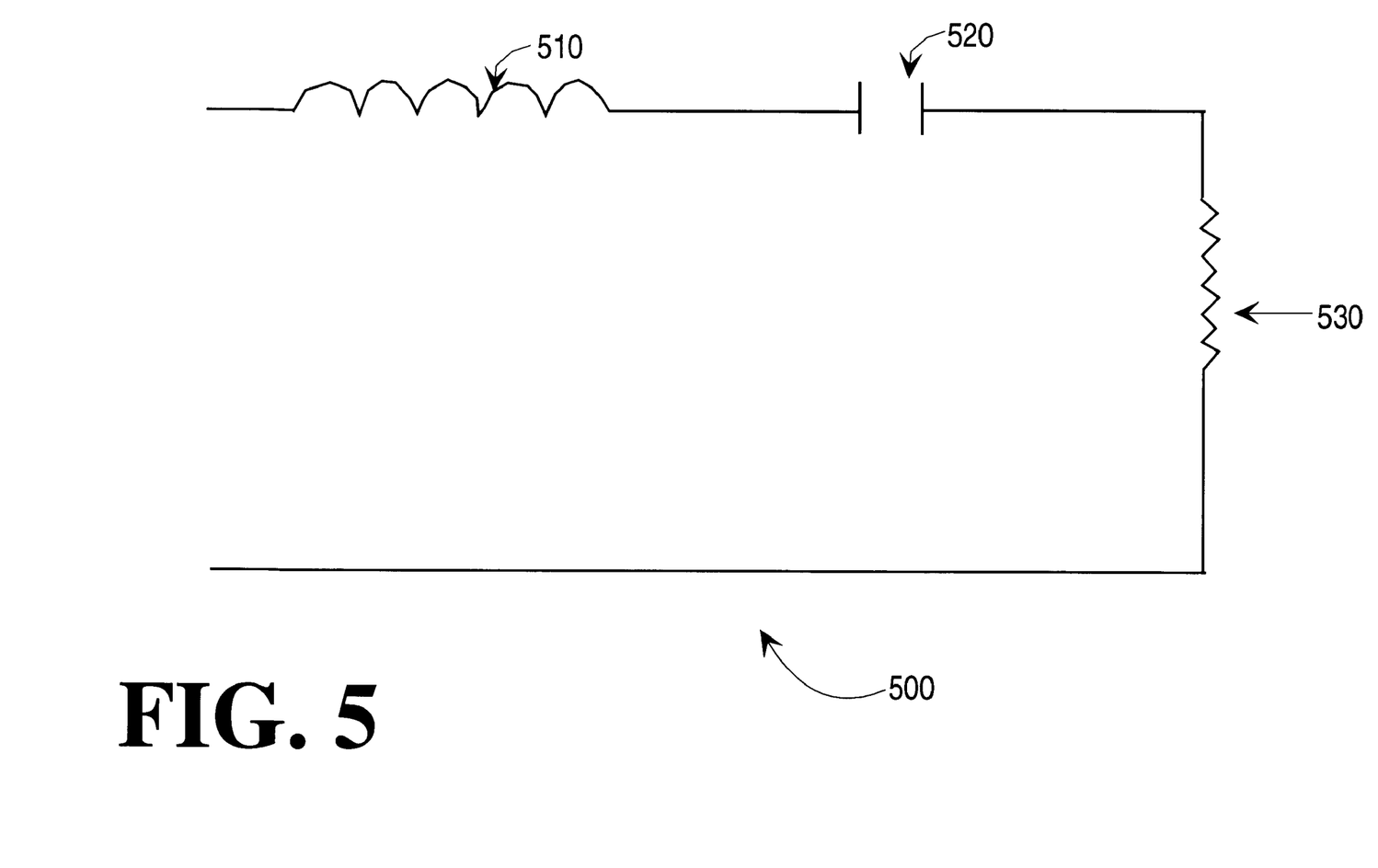
FIG. 5 is an equivalent circuit of a protection circuit and a post-regulator unit.

FIG. 5 illustrates an equivalent circuit 500 of the protection circuit 410 (shown in FIG. 4) and the post-regulator unit 261 (shown in FIG. 4). The inductor 510 and the capacitor 520 represent components in the protection circuit 410. The resistor 530 represents the resistive load of the post-regulator unit 261. When the high frequency AC voltage regulator module is supplied a nominal amount of current, the effective voltage drop across the components in the equivalent circuit 500 is virtually zero. The quality factor (Q) in this situation is within a predetermined limit. According to an embodiment of the present invention, Q has the predetermined limit of 2.2 to 2.8. When the current supplied to the high frequency AC voltage regulator module 260 (shown in FIG. 2) exceeds the nominal limit, the Q increases which results in an increase of the voltage across the inductor 510 and the capacitor 520. This causes the inductor 510 to saturate. The saturation effect reduces the value of its inductance, pushing the in-series resonant circuit out of resonance and reduces the voltage across the terminals of the protection circuit 261 which is represented by the resistor 530. Accordingly, this reduces the current through the protection circuit 261.

Referring back to FIG. 4, the post-regulator unit 261 is coupled to the protection circuit 410. The post-regulator unit 261 includes a transformer 411. The transformer 411 receives the high frequency AC power from the AC bus 255 and steps the high frequency AC power down to a lower level. A rectifier unit 412 is coupled to the transformer 411. The rectifier unit 412 receives the high frequency AC power from the transformer and converts the high frequency AC power into the DC domain. A filtering unit 413 is coupled to the rectifier unit 412. The filtering unit 413 receives the DC power from the rectifier unit 412 and filters away noise from the DC power before transmitting the power to a component on the computer system (not shown) via line 420. A controller unit 414 is coupled to the line 420 and the rectifier unit 412. The controller unit 414 monitors the voltage and current levels on the line 420 and adjusts the rectifier unit 412 such that the power transmitted onto the line 420 via the filter 413 is at predetermined level. According to an embodiment of the present invention, the post regulator 261 may include only the rectifier unit 412 that converts the high frequency AC power from the AC bus into the DC domain before transmitting it to the line 420.

The transformer 411, rectifier unit 412, filtering unit 413, and the controller unit 414 may be implemented using any known circuitry or technique. In an embodiment of the present invention, the rectifier unit 412, filtering unit 413, and the controller unit 414 all reside on a single semiconductor substrate.

The system power supply 250 (shown in FIG. 2) and the high frequency AC voltage regulator module 260 (shown in FIG. 2) allows the distribution of power in a high frequency AC domain. Distribution of power in the high frequency AC domain improves the reliability of regulation of current to components in the computer system having high DI/DT requirements. The system power supply 250 and the high frequency AC voltage regulator module 260 also eliminates the need for dual conversion as required by DC power distribution systems. Furthermore, the utilization of the AC bus 255 to distribute high frequency AC power eliminates the requirement of multiple winding transistors and additional rectifiers and filters.

Figure 6A:
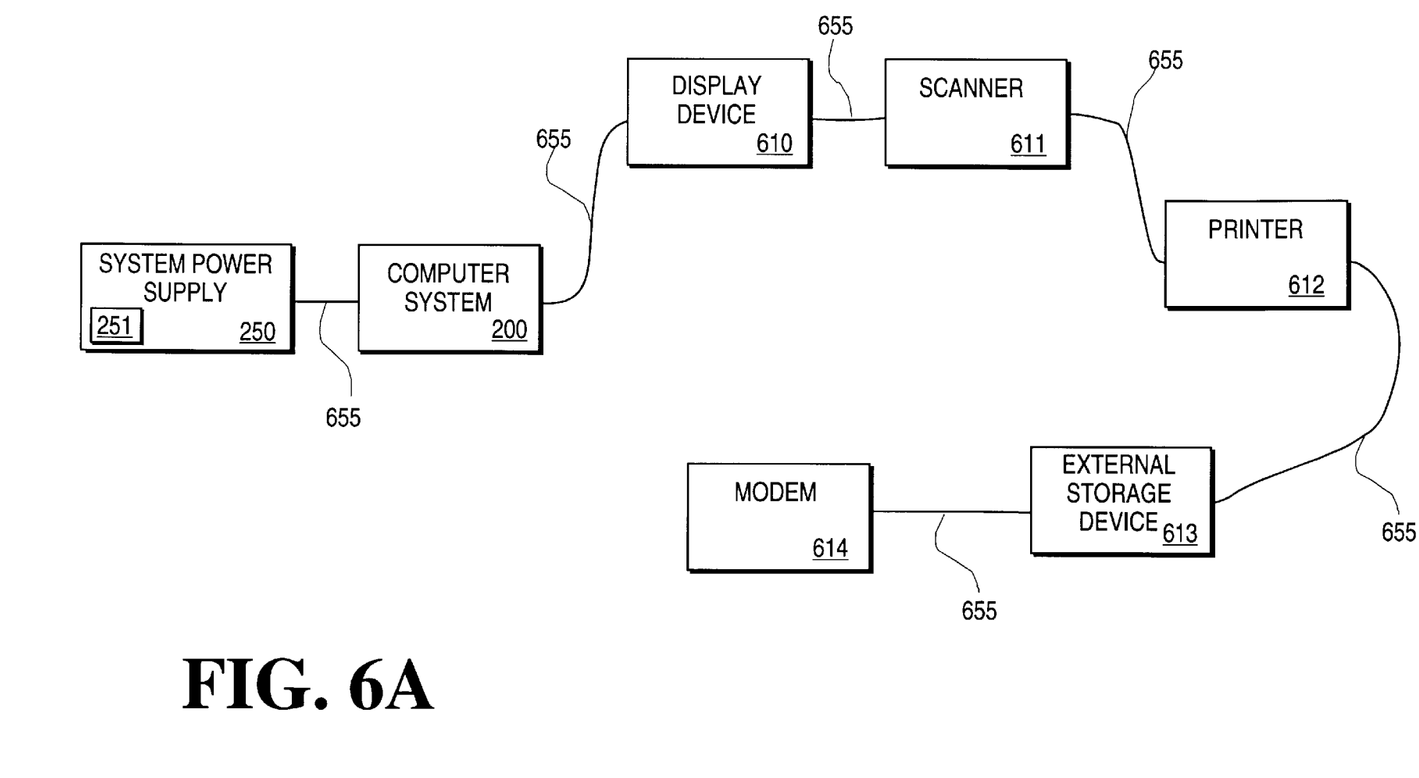
FIG. 6a is a block diagram illustrating devices external to the chassis of a computer system connected together in a daisy-chain topology and powered by the high frequency alternating current power distribution system according to an embodiment of the present invention.
Figure 6B:
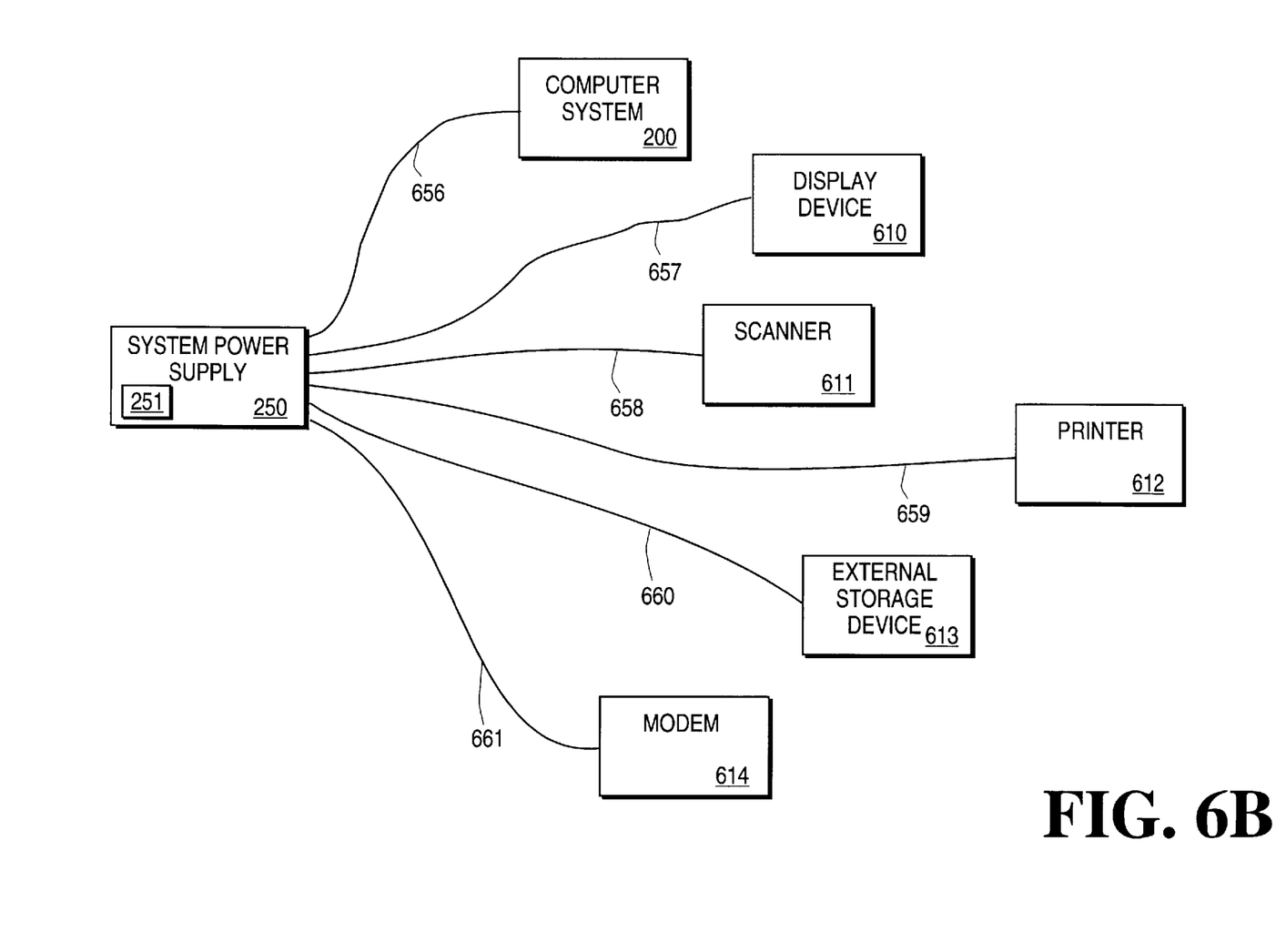
FIG. 6b is a block diagram illustrating devices external to the chassis of a computer system connected together in a hub topology and powered by the high frequency alternating current power distribution system according to an embodiment of the present invention.

It should be appreciated that the high frequency AC power distribution system of the present invention may also be used to supply power to devices connected externally to chassis of the computer system 200 (shown in FIG. 2) such as printers, scanners, external storage devices, modems, integrated services digital network (ISDN) devices, cameras, and other devices. According to an embodiment of the present invention, the system power supply 250 may reside external to the chassis of the computer system 200. The system power supply 250 may supply power to the computer system 200 and the devices connected externally to the chassis of the computer system 200 via a single cable configured in a daisy chain as illustrated in FIG. 6a. In this embodiment, an AC bus (not shown) may reside inside the system power supply 250 and a single signal bus 655, such as a Universal Serial Bus, may be coupled to the AC bus and used to deliver power to the computer system 200, display device 610, scanner 611, printer 612, external storage device 613, and modem 614. Alternatively, the system power supply 250 may supply power to the computer system 200 and the devices connected externally to the chassis of the computer system 200 via a hub configuration as illustrated in FIG. 6b. In this embodiment, a plurality of signal buses 656–661, such as Universal Serial Buses, may be coupled to the AC bus and used to deliver power to the computer system 200, display device 610, scanner 611, printer 612, external storage device 613, and modem 614. Each of the devices connected externally to the chassis of the computer system 200 includes a high frequency AC voltage regulator module such as the one described in FIG. 4.

By utilizing the high frequency AC power distribution system of the present invention to distribute power to devices connected externally to the chassis of the computer system 200, the devices are no longer required to have their own independent power supply. Thus, cost and physical space requirements for these devices are reduced.

Figure 7:
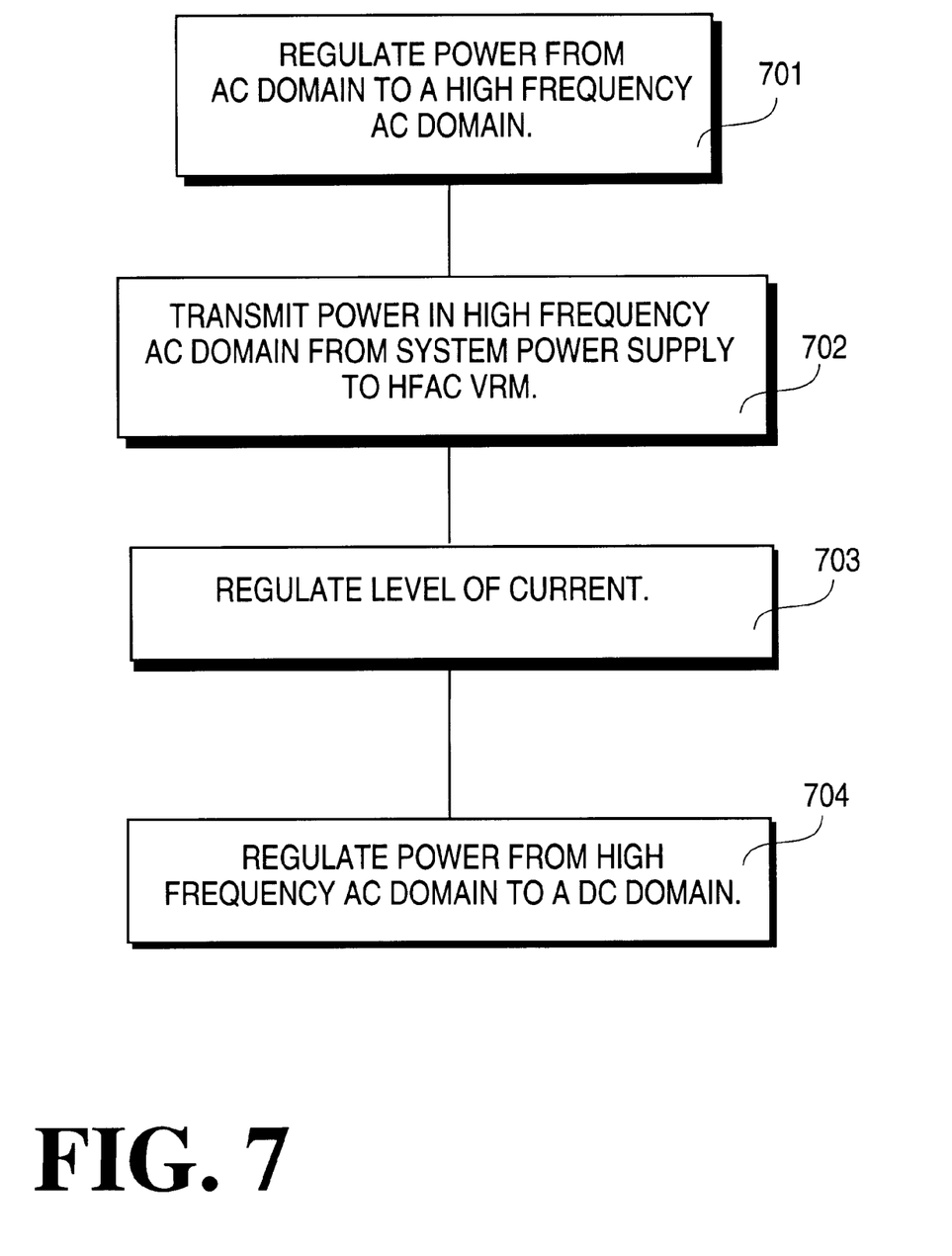
FIG. 7 is a flow chart illustrating a method for distributing power according to an embodiment of the present invention.

FIG. 7 is a flow chart illustrating a method for distributing power according to an embodiment of the present invention. At step 701, power in an AC domain is regulated to a high frequency AC domain. According to an embodiment of the present invention, the power in the AC domain is regulated to the high frequency AC domain by rectifying the power from the AC domain to a DC domain and converting the power from the DC domain to the high frequency AC domain.

At step 702, the high frequency AC power is transmitted from a system power supply to a high frequency AC voltage regulator module.

At step 703, a level of current received from the system power supply is regulated. According to an embodiment of the present invention, the level of current is regulated by a protection circuit in the high frequency AC voltage regulator module.

At step 704, the power is regulated from the high frequency AC domain to a DC domain. According to an embodiment of the present invention, the power is regulated from the high frequency AC domain to the DC domain by stepping down the power and rectifying the power from the high frequency AC domain to the DC domain. According to an embodiment of the present invention, the power is regulated from the high frequency AC domain to the DC domain by a post-regulator unit in the high frequency AC voltage regulator module.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A high frequency alternating current (AC) voltage regulator module (VRM), comprising:

a protection circuit that regulates a level of current from power in a high frequency AC domain received from an AC bus, the protection circuit including a capacitor and an inductor; and a post-regulator unit, coupled to the protection circuit, that regulates the power to a component on a computer system, the post-regulator unit including a resistive load;

the capacitor and the inductor from the protection circuit and the resistive load from the post-regulator unit forming an in-series resonant circuit.

2. The high frequency AC VRM of claim 1, wherein the in-series resonant circuit has a quality factor (Q) between 2.2 and 2.8.

3. The high frequency AC VRM of claim 1, wherein the post-regulator unit comprises a rectifier unit that converts the power from the high frequency AC domain to a direct current (DC) domain.

4. The high frequency AC VRM of claim 1, wherein the post-regulator unit further comprises a filtering unit that filters out noise from an output of the power from the DC domain.

5. A computer system, comprising:

a bus;

a system power supply, coupled to the bus, that transmits power in a high frequency alternating current (AC) domain on the bus;

a high frequency AC voltage regulator module (VRM), coupled to the bus, that includes a protection circuit, including a capacitor and an inductor, that regulates a level of current from the bus and a post-regulator unit, including a resistive load, that regulates the power from the high frequency AC domain to a direct current (DC) domain;

the capacitor and the inductor from the protection circuit and the resistive load from the post-regulator unit forming an in-series resonant circuit; and a processor, coupled to the high frequency AC VRM, that receives the power from the AC VRM.

6. The computer system of claim 5, wherein the in-series resonant circuit has a quality factor (Q) between 2.2 and 2.8.

7. The computer system of claim 5, wherein the post-regulator unit comprises a rectifier unit that converts the power from the high frequency AC domain to a direct current (DC) domain.

8. The computer system of claim 7, wherein the post-regulator unit further comprises a filtering unit that filters out noise from an output of the power from the DC domain.

9. A method for distributing power in a computer system, comprising:

transmitting power in a high frequency alternating current (AC) domain from a system power supply of the computer system to a high frequency AC voltage regulator module, having a protection circuit including a capacitor and an inductor, and a post-regulator unit including a resistive load, the capacitor and the inductor from the protection circuit and the resistive load from the post-regulator unit forming an in-series resonant circuit; and regulating a level of current received from the system power supply that is sent to the post-regulator unit of the high frequency AC voltage regulator.

10. The method of claim 9, further comprising regulating the power in the high frequency AC domain to a direct current (DC) domain.

11. The method of claim 10, wherein regulating the power in the high frequency AC domain to the DC domain comprises:

stepping down the power; and rectifying the power from the high frequency AC domain to the DC domain.

* * * * *